(12) United States Patent
Weigle et al.

(10) Patent No.: US 8,865,002 B2
(45) Date of Patent: Oct. 21, 2014

(54) PROCESSING CAPTURED VEHICLE FLUID

(75) Inventors: James K Weigle, Lake Jackson, TX (US); Ben A Hammock, II, Rosharon, TX (US); Robert Tupper, Richmond, TX (US)

(73) Assignee: Brimtech, LLC, Lake Jackson, TX (US)

( * ) Notice: Subject to any disclaimer, the term of this patent is extended or adjusted under 35 U.S.C. 154(b) by 826 days.

(21) Appl. No.: 12/905,044

(22) Filed: Oct. 14, 2010

(65) Prior Publication Data

US 2011/0089120 A1 Apr. 21, 2011

Related U.S. Application Data

(60) Provisional application No. 61/251,988, filed on Oct. 15, 2009.

(51) Int. Cl.
| | | |
|---|---|---|
| *E03B 3/28* | (2006.01) | |
| *C02F 9/04* | (2006.01) | |
| *C02F 1/00* | (2006.01) | |
| *B60S 1/50* | (2006.01) | |
| *C02F 103/00* | (2006.01) | |
| *C02F 1/32* | (2006.01) | |
| *C02F 1/02* | (2006.01) | |
| *C02F 1/68* | (2006.01) | |
| *C02F 1/44* | (2006.01) | |
| *C02F 103/44* | (2006.01) | |

(52) U.S. Cl.
CPC ............. *C02F 1/00* (2013.01); *C02F 2103/001* (2013.01); *C02F 1/32* (2013.01); *C02F 1/02* (2013.01); *C02F 1/68* (2013.01); *C02F 1/44* (2013.01); *B60S 1/50* (2013.01); *C02F 2201/009* (2013.01); *C02F 2209/42* (2013.01); *C02F 1/001* (2013.01); *C02F 2103/44* (2013.01)
USPC ............. 210/744; 210/136; 210/109; 210/86; 137/59; 137/386

(58) Field of Classification Search
CPC ............. B01D 35/14; B60S 1/50; C02F 1/00; C02F 1/001; C02F 1/02; C02F 1/32; C02F 1/44; C02F 1/68; C02F 2103/001; C02F 2103/44; C02F 2201/009; C02F 2209/42
USPC .......... 210/774, 136, 109, 86, 744; 137/2, 59, 137/386
See application file for complete search history.

(56) References Cited

U.S. PATENT DOCUMENTS

| | | | | |
|---|---|---|---|---|
| 5,076,763 | A  * | 12/1991 | Anastos et al. | ............. 417/44.11 |
| 5,435,151 | A  * | 7/1995 | Han | .................................. 62/272 |
| 5,651,259 | A  * | 7/1997 | Twyman | ............................ 62/93 |
| 6,464,854 | B2 | 10/2002 | Andrews et al. | |
| 6,804,949 | B2 * | 10/2004 | Andrews et al. | ................. 60/272 |
| 7,389,651 | B2 | 6/2008 | Cantolino | |
| 8,252,174 | B2 * | 8/2012 | Jones et al. | .................... 210/149 |
| 2005/0103721 | A1 * | 5/2005 | Fritze | ............................ 210/744 |
| 2006/0005561 | A1 * | 1/2006 | Murphy et al. | .................. 62/285 |

FOREIGN PATENT DOCUMENTS

DE 3009867 A1 * 9/1981

OTHER PUBLICATIONS

Krause, English abstract DE 3009867, 1981, pp. 1-2.*

* cited by examiner

*Primary Examiner* — Nam Nguyen
*Assistant Examiner* — Claire Norris
(74) *Attorney, Agent, or Firm* — The Compton Law Firm, P.C.; Scott D. Compton

(57) ABSTRACT

The present application is directed to a system and method for processing fluid captured from a vehicle surface to provide a desired fluid product. The system includes sensors and control circuitry to determine system fluid volume levels and/or the ambient temperature of the system to safeguard the system against non-requested activation or deactivation.

20 Claims, 9 Drawing Sheets

PROCESSING CAPTURED VEHICLE FLUID

CROSS-REFERENCE TO RELATED APPLICATIONS

The application is entitled to the benefit of the filing date of the prior-filed provisional application No. 61/251,988, filed on Oct. 15, 2009.

STATEMENT REGARDING FEDERALLY SPONSORED RESEARCH OR DEVELOPMENT

Not applicable.

FIELD OF THE APPLICATION

The application relates generally to processing captured vehicle fluid for future use thereof.

BACKGROUND

Vehicles such as automobiles are often equipped with fluid reservoirs such as windshield wiper fluid reservoirs, radiator overflow reservoirs and the like. Depending on the type of vehicle and/or fluid composition(s) being used, a particular fluid reservoir may require periodic refilling as existing fluid is used up. Also, it is often necessary to replenish a particular reservoir with a fluid that is compositionally similar to the spent fluid.

Simply refilling fluid reservoirs with water that is captured from vehicular condensation may be sufficient in particular instances. However, water is often times an insufficient refill fluid for certain vehicle reservoir purposes. Therefore, a need exists for capturing fluid such as water from a vehicle, processing the fluid to provide one or more desired fluid product(s), and delivering the fluid product(s) to one or more specified vehicular fluid reservoir(s) for further use as desired.

SUMMARY

The present application is directed to a system for processing fluid captured from a vehicle surface. The system comprises (1) a reservoir operationally configured to receive fluid from the vehicle surface and to discharge fluid received therein; (2) a fluid circulation means in fluid communication with the reservoir and operationally configured to convey fluid out from the reservoir; (3) one or more treatment members in fluid communication with the reservoir, the one or more treatment members being operationally configured to treat the captured fluid to provide a fluid product, the one or more treatment members being in fluid communication with an outlet of the system; (4) a fluid volume sensor system in the reservoir, the fluid volume sensor system being in electrical communication with the fluid circulation means, the fluid volume sensor system being operationally configured to identify the fluid volume within the reservoir; and (5) control circuitry in electrical communication with the fluid volume sensor system and fluid circulation means, the control circuitry being operationally configured to safeguard the system against non-requested operation of the fluid circulation means during vehicle use; wherein operation of the fluid circulation means may be determined according to the fluid volume within the reservoir; and wherein the system is powered by a power source originating from the vehicle.

The present application is also directed to a system for processing water captured from a vehicle air conditioner drip pan. The system comprises (1) a first reservoir operationally configured to receive and store water from the drip pan in a first compartment of the reservoir; (2) a pump located within a second compartment of the reservoir, the pump being in fluid communication with the first compartment of the reservoir and operationally configured to convey water out from the first compartment of the reservoir; (3) one or more treatment members in fluid communication with the pump, the one or more treatment members being operationally configured to treat the captured water; (4) a second reservoir in fluid communication with the one or more treatment members, the second reservoir being operationally configured to receive treated water from the one or more treatment members; and (5) a fluid volume sensor system including a fluid volume sensor in the first reservoir and a fluid volume sensor in the second reservoir, the fluid volume sensor system being in electrical communication with the pump via control circuitry; wherein the fluid volume sensor system is operationally configured to identify the water volume within the first and second reservoirs; wherein pump activation is determined by the water volume within the first and second reservoirs; and wherein the treated water has a chemical constituency different than the chemical constituency of the captured water.

The present application is also directed to a method for processing fluid captured from a vehicle surface comprising:
(1) providing a system comprising (a) a reservoir operationally configured to receive fluid from the vehicle surface and to discharge fluid received therein; (b) a fluid circulation means in fluid communication with the reservoir and operationally configured to convey fluid out from the reservoir; (c) one or more treatment members in fluid communication with the reservoir, the one or more treatment members being operationally configured to treat the captured fluid to provide a fluid product, the one or more treatment members being in fluid communication with an outlet of the system; (d) a fluid volume sensor system in the reservoir, the fluid volume sensor being in electrical communication with the fluid circulation means, the fluid volume sensor system being operationally configured to identify the fluid volume within the reservoir; and (e) control circuitry in electrical communication with the fluid volume sensor system and fluid circulation means, the control circuitry being operationally configured to safeguard the system against non-requested operation of the fluid circulation means during vehicle use; wherein operation of the fluid circulation means may be determined according to the fluid volume within the reservoir; and wherein the system is powered by a power source originating from the vehicle;
(2) capturing fluid from a vehicle surface and storing the fluid within a reservoir;
(3) conveying the fluid from the reservoir to one or more treatment members;
(4) treating the fluid within the one or more treatment members; and
(5) conveying the treated fluid to a target location.

BRIEF DESCRIPTION

Figure 1:
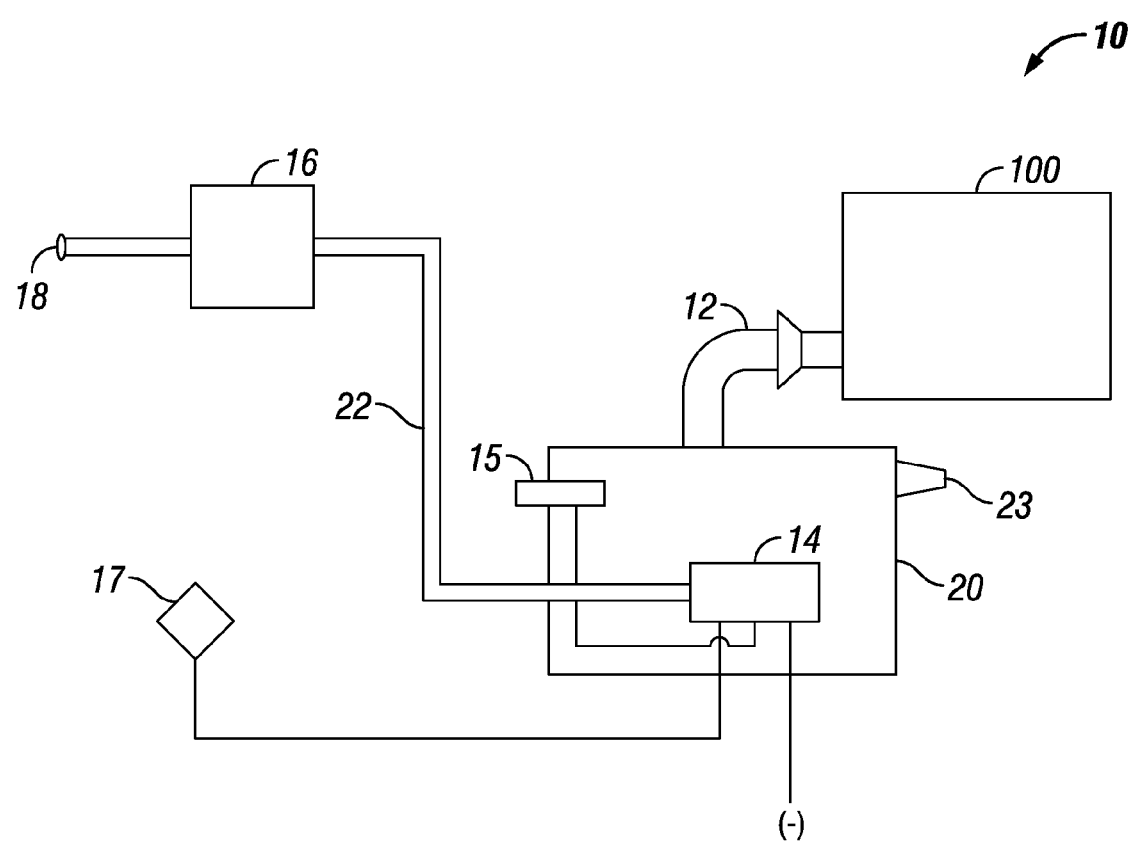
FIG. 1 is an exemplary system for processing condensed vehicular fluid.

It has been discovered that one or more fluids may be captured from various surfaces or compartments of a vehicle and processed in a manner effective to provide fluid for future constructive vehicular use. Suitably, the captured fluid may be processed for various purposes according to various methods including but not necessarily limited to filtering, ionizing, heating, ultra-violet light exposure, the addition of chemicals, and combinations thereof. For example, processed fluid may be used to replenish existing vehicular fluid reservoirs such as windshield washer fluid reservoirs and radiators, provide potable water, and provide water for consumption by on-board electrolyzers for producing hydrogen. Captured fluid may also be processed for uses separate and apart from the subject vehicle. In addition, captured fluid may be stored on the subject vehicle for future processing. Activation of any fluid processing may also be controlled to guard against the undesired processing of fluid. Heretofore, such a desirable achievement has not been considered possible, and accordingly, the system and method of this application measure up to the dignity of patentability and therefore represents a patentable concept.

Before describing the invention in detail, it is to be understood that the present system and method are not limited to particular embodiments. It is also to be understood that the terminology used herein is for the purpose of describing particular embodiments only, and is not intended to be limiting. As used in this specification and the appended claims, "vehicle," "vehicular" and like terms refer to any motorized mode of conveyance capable of traveling across land, rail, water or air. The term "processing" as applied to the processing of vehicular fluid, refers to the capture, storage, treatment and delivery or routing of fluid to one or more locations of a vehicle. The terms "treat," "treatment" and like terms refer to affecting the captured fluid or otherwise acting upon the captured fluid within the system to produce one or more desired fluid products.

In one aspect, the application provides a system and method of capturing condensed fluid from a vehicle surface, treating the fluid, and routing the treated fluid to a fluid reservoir of the vehicle.

In another aspect, the application provides a system for capturing fluid from a vehicle air conditioner, treating the fluid, and delivering the treated fluid to a fluid reservoir of the vehicle.

In another aspect, the application provides a system for processing captured condensed vehicular fluid to produce a fluid having a composition different from the condensed fluid initially captured from the vehicle for processing.

In another aspect, the application provides a system for processing condensed vehicular fluid to provide a replenishing fluid for a depleted vehicle reservoir, the composition of the replenishing fluid being substantially similar to the fluid initially housed within the depleted vehicle reservoir.

In another aspect, the application provides a simple, inexpensively constructed and operated system and method for capturing condensed vehicular fluid from a continuous source and distributing it to a vehicle fluid reservoir.

In another aspect, the application provides a system for processing captured vehicular fluid, the system including one or more safety features operationally configured to protect against non-requested, undesired or unnecessary operation of the system.

In another aspect, the application provides a simple, inexpensively constructed and operated system and method for capturing or otherwise collecting fluid from a continuous vehicular source and distributing the captured fluid to a plurality of fluid reservoirs of the vehicle.

In another aspect, the application provides a system that processes condensed water captured from an air conditioner of a vehicle.

In another aspect, the application provides a vehicular system operationally configured to capture water that would otherwise drip away or evaporate from a vehicle surface, treat the water, and route the treated water to various fluid reservoirs of the vehicle or to a central reservoir for later use thereof.

In another aspect, the application provides a system including electrical control circuitry in communication with a system pump operationally configured for the transfer of captured vehicular fluid from a lower elevation to a higher elevation in the system.

In another aspect, the application provides a system including a fluid condensate capturing means operationally fitted with a plurality of downstream fluid outputs.

In another aspect, the application provides a system operationally configured to capture condensed vehicular fluid destined to otherwise drip away from the vehicle or evaporate, and process the fluid for future constructive use by filtering and/or adding chemical constituents to the fluid and/or altering the temperature of the fluid as desired.

In another aspect, the application provides a system having a pump and fluid level sensors in electrical communication, the fluid level sensors being operationally configured to determine the fluid levels of various reservoirs of the system. The system being operationally configured to guard against non-requested, undesired or unnecessary operation of the pump during vehicle use.

In another aspect, the application provides a relatively inexpensive fluid capture, treatment, and delivery system that is adaptable and installable for use with most commercially available vehicles including automobiles.

In another aspect, the application provides a system having an accurate and reliable safety cutoff feature.

In another aspect, the application provides a system having a temperature switch for shutting off the system once a certain ambient temperature of the system has been reached.

In another aspect, the present system has a heating element for heating captured fluid.

In another aspect, the present system includes a safety feature operationally configured to prevent the system from providing both a reservoir full signal and a reservoir empty signal simultaneously.

In another aspect, the application provides a manually actuated system for processing captured vehicular fluid.

In another aspect, the application provides a system for capturing and storing fluid condensate at a temperature other than the ambient temperature of the system.

In another aspect, the application provides a system including a time delay means effective to guard against non-requested, undesired or unnecessary operation of the system.

In another aspect, the application provides an automatic fluid capture, treatment and distribution system wherein, without manual intervention, the system is operationally configured to (1) capture condensed fluid from a vehicle air conditioner, (2) process the fluid, and (3) route the processed fluid to a fluid reservoir for future use thereof.

Discussion of the System and Method

To better understand the novelty of the system and method of use thereof, reference is hereafter made to the accompanying drawings, in which like numerals represent like components throughout the several views. The following description is merely exemplary in nature and is in no way intended to limit the invention, its application, or uses.

Figure 2:
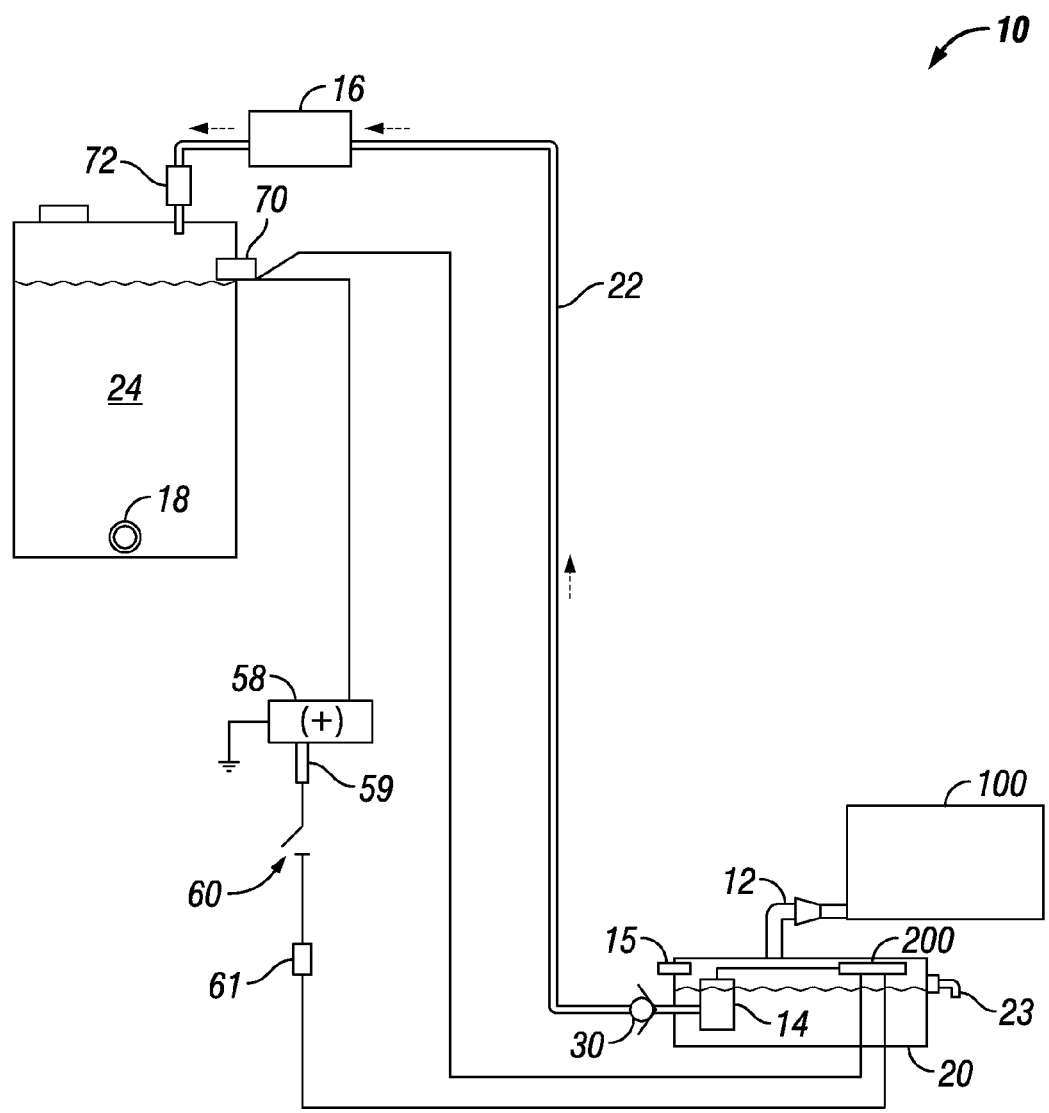
FIG. 2 is another exemplary system for processing condensed vehicular fluid.

Variations of a simplified system 10 for processing captured condensed vehicular fluid are depicted in FIGS. 1 and 2. With reference to FIG. 1, the system 10 suitably comprises at least (1) a fluid reservoir 20, (2) an inlet member 12 in fluid communication with the fluid reservoir 20, the inlet member 12 being operationally configured to capture fluid from a vehicle surface 100, (3) a fluid circulation means 14 in fluid communication with the fluid reservoir 20, (4) a fluid volume sensor system 15 attached to the fluid reservoir in electrical communication with the fluid circulation means 14, (5) a treatment member 16 in fluid communication with the fluid circulation means 14 via conduit 22, (6) a power source 17 in electrical communication with the fluid circulation means 14 and fluid volume sensor system 15, and (7) an outlet 18 in fluid communication with the treatment member 16 via conduit 22. In operation, fluid is suitably conveyed via the fluid circulation means 14 from the fluid reservoir 20 through the treatment member 16 to the outlet 18 via conduit 22.

Without limiting the invention, the inlet member 12 is suitably operationally configured to receive collected fluid from a surface or basin of a vehicle, or to receive fluid condensate (hereafter "condensate") from a condensate producing system of a vehicle. For example, as condensate accumulates on the surface of a vehicle's air conditioning evaporator coil (hereafter "A/C") the inlet member 12 is operationally configured to receive condensate from the NC drip pan, where after the fluid may be stored in the fluid reservoir 20.

In one exemplary embodiment, the fluid reservoir 20 may be sealed to a vehicle surface 100 such as an NC drip pan in a manner effective to capture condensate, or the fluid reservoir 20 may be provided as an all-in-one condensate producing/condensate capture reservoir, e.g., a system 10 provided as part of the vehicle at the manufacturing stage. In another embodiment, the inlet member 12 and fluid reservoir 20 may be installed and fluidly connected to a pre-existing vehicle surface 100, e.g., a system 10 operationally configured for after-market use.

In still another embodiment, the inlet member 12 may comprise a collection pan in fluid communication with a fluid reservoir 20 wherein the collection pan set apart from a vehicle surface 100 is operationally configured to capture condensate as the condensate drops from the vehicle surface 100, the captured fluid thereafter flowing via gravity into the fluid reservoir 20. Hereafter, reference to a vehicle surface 100 will be discussed in terms of a vehicle A/C drip pan 100.

With reference to FIG. 2, the system 10 may further comprise one or more post-treatment reservoirs 24 in fluid communication with both the treatment member 16 and the outlet 18. The system 10 may also include a valve 30 located downstream from the fluid circulation means 14 operationally configured to regulate back flow of fluid in the conduit 22 toward the fluid circulation means 14. In this embodiment, the valve 30 is suitably positioned along the conduit 22 at a point between the fluid circulation means 14 and the treatment member 16. In another embodiment, both the valve 30 and the fluid circulation means 14 may be housed within the fluid reservoir 20, the valve 30 being suitably positioned along the conduit 22 between the fluid reservoir 20 and the treatment member 16.

The system 10 may further include one or more secondary treatment members (not shown). For example, one or more secondary treatment members may be operationally configured to act on fluid housed within the fluid reservoir 20 prior to being pumped to conduit 22. One or more secondary treatment members may be operationally configured to act on fluid housed within the second fluid reservoir 24 once the fluid is directed out through outlet 18. In still another embodiment, one or more secondary treatment members may be operationally configured to act on fluid flowing through a second conduit of the system 10.

As previously stated, the system 10 may be installed during the vehicle's manufacturing process or the system 10 may be installed in a vehicle as an aftermarket item. Thus, the configuration of the fluid reservoir 20 may vary as required based on the intended use of the system 10 and the design of the subject vehicle including space requirements thereof.

Figure 3:
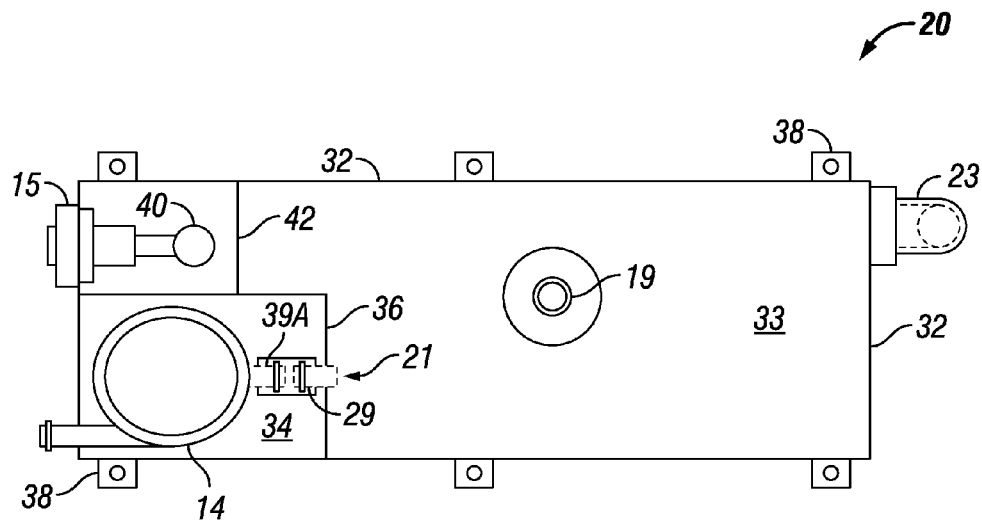
FIG. 3 is a top view of an embodiment of a fluid reservoir of the present system.
Figure 4:
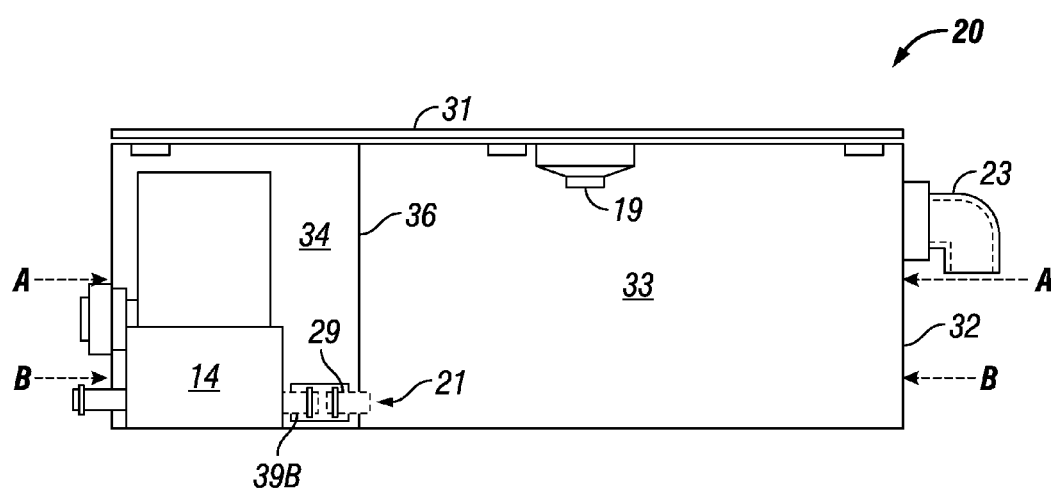
FIG. 4 is a side view of the fluid reservoir of FIG. 3.

With reference to FIGS. 3 and 4, a simplified embodiment of a fluid reservoir 20 provided during a vehicle's manufacturing process is shown. In this embodiment, the fluid reservoir 20 suitably includes (1) a multi-sided outer housing 32 having a reservoir inlet 19 there through, (2) a first compartment 33 for storing captured fluid, (3) a second compartment 34 for housing a fluid circulation means 14, the second compartment 34 being separated by the first compartment 33 via (4) a solid barrier 36 having a reservoir outlet 21 there through, (5) a fluid volume sensor system 15 housed within the first compartment 33, and (6) an overflow outlet 23 in the outer housing 32 for the release of any unwanted fluid from the fluid reservoir 20. With reference to an automobile A/C 100, much more condensed water is generated than is ever requested for system 10 use. Thus, the overflow outlet 23 allows the fluid reservoir 20 to dump excess fluid from the system 10.

Figure 5A:
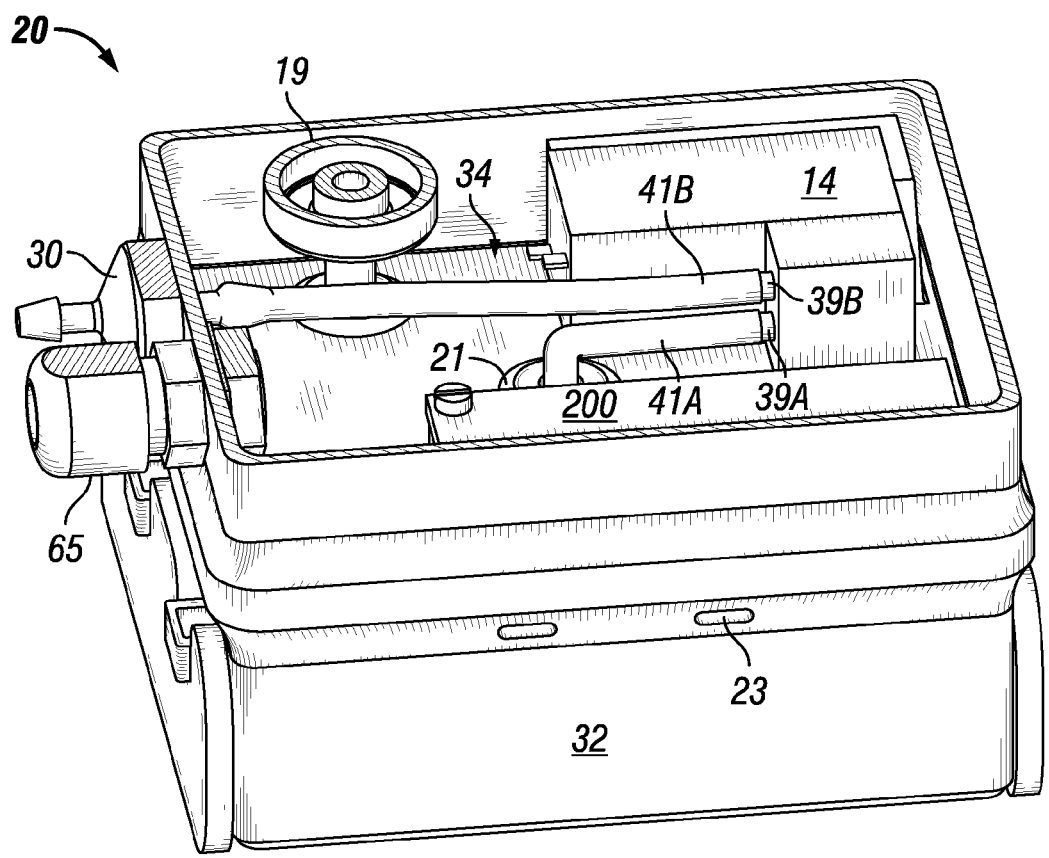
FIG. 5A is a top perspective cross-sectional view of another embodiment of a fluid reservoir of the present system.
Figure 5B:
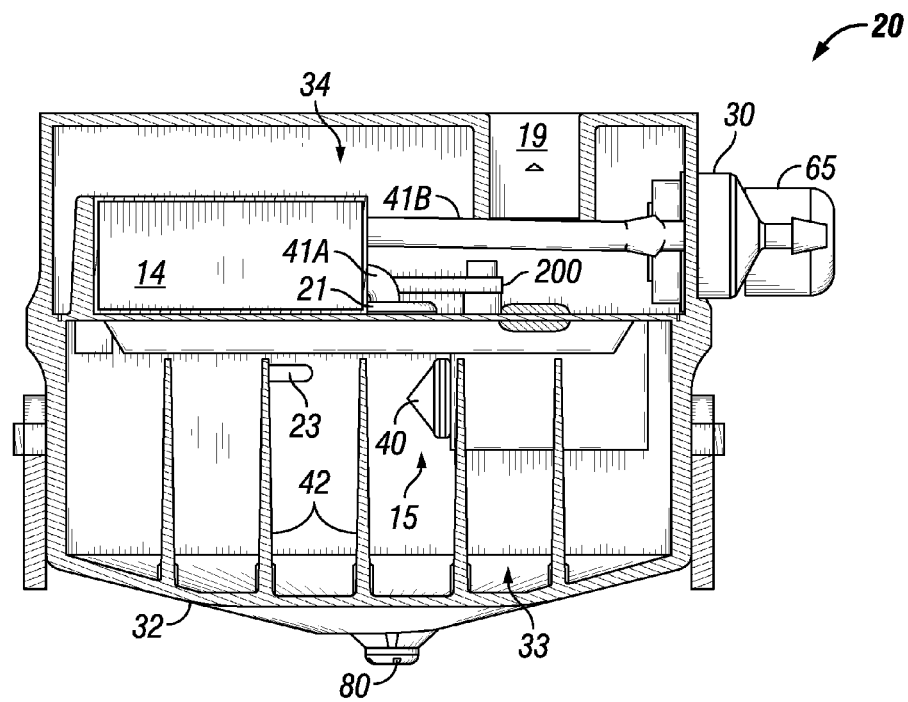
FIG. 5B is a side cross-sectional view of the fluid reservoir of FIG. 5A.
Figure 6:
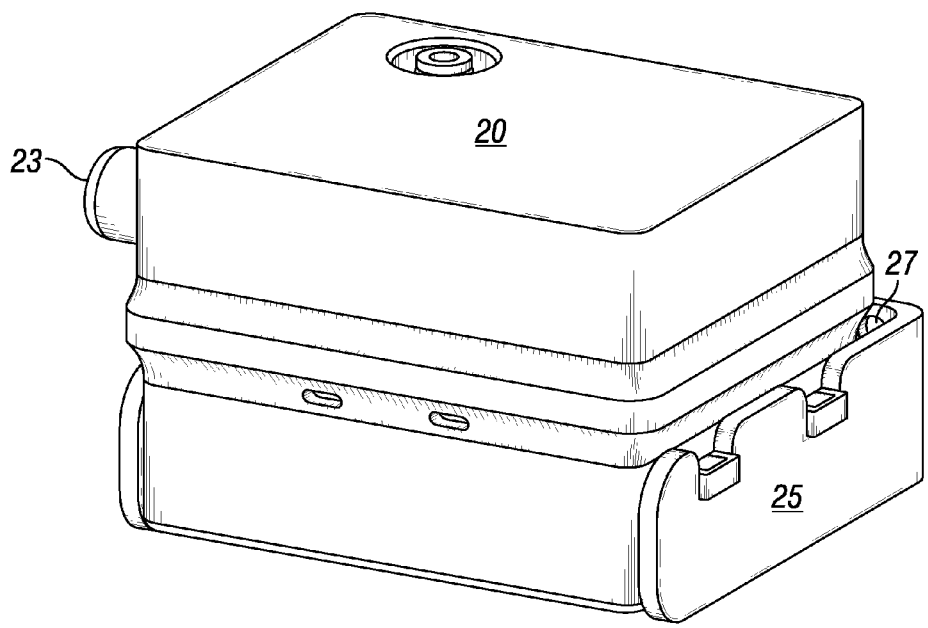
FIG. 6 is a top perspective view of the fluid reservoir of FIG. 5A including a bracket operationally configured to releasably attach the fluid reservoir to a vehicle.
Figure 7:
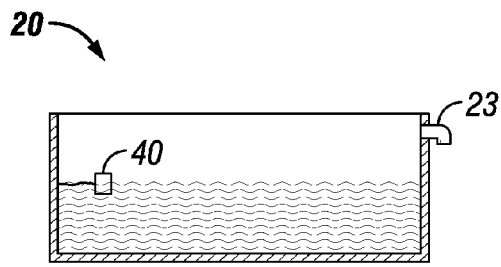
FIG. 7 is an illustration of a fluid reservoir employing a float switch wherein the fluid housed within the fluid reservoir has a substantially level surface.
Figure 8:
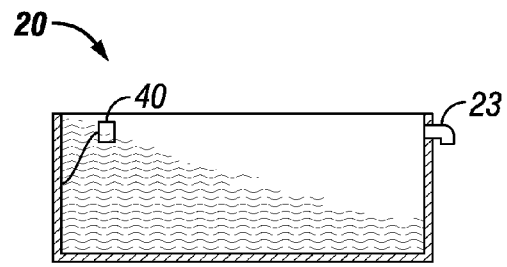
FIG. 8 illustrates the fluid reservoir of FIG. 7 wherein the fluid housed within the fluid reservoir is sloshed toward the float switch raising the float switch.

Turning to FIGS. 5A and 5B, an after-market embodiment of the fluid reservoir 20 is provided. In this embodiment, the fluid storing first compartment 33 of the fluid reservoir 20 is oriented below the second compartment 34. As shown, the second compartment 34 is operationally configured to house (1) a reservoir inlet 19, the reservoir inlet 19 being in fluid communication with inlet member 12 (not shown), (2) a fluid circulation means 14, (3) a check valve 30, (4) conduits fluidly connecting the inlet 19 to the first compartment 33, the first compartment 33 to the fluid circulation means 14, and the fluid circulation means 14 to the check valve 30, and (4) control circuitry 200. As shown in FIG. 6, the fluid reservoir 20 may be set within a corresponding bracket 25, the bracket 25 having one or more apertures 27 there through for receiving fasteners operationally configured to releasably attach the fluid reservoir 20 to a vehicle surface.

The reservoir inlet 19 may comprise any aperture configuration suitable for introducing fluid into the fluid reservoir 20. In the embodiment of FIGS. 5A-5B, the reservoir inlet 19 is in fluid communication with the drip pan 100 via inlet member 12, the inlet member 12 including a conduit fluidly sealed at a first end to the drip pan 100 and fluidly sealed at the second end to the reservoir inlet 19. In one embodiment, the drip pan 100, inlet member 12 and fluid reservoir 20 may be provided as a one piece mold construction during vehicle manufacturing for permanent attachment to the vehicle. In another embodiment, inlet member 12 and fluid reservoir 20 may be constructed as separate parts for further assembly and releasable attachment to a drip pan 100. As necessary and depending on the parts design and/or materials of construction, the drip pan 100, inlet member 12 and fluid reservoir 20 may be sealably assembled as is or using fittings via an adhesive material for sealing the fittings to the system 10 parts. Suitable fittings include, but are not necessarily limited to rubber grommets, rubber barbed fittings, plastic barbed fittings, and combinations thereof. A suitable adhesive includes, but is not necessarily limited to a two-part epoxy adhesive.

In the embodiment of FIGS. 3 and 4, the fluid reservoir 20 suitably has one or more mounting tabs 38 for receiving fasteners there through effective for releasably attaching the fluid reservoir 20 to a vehicle surface. Suitable fasteners include one or more threaded screws or other common removable fasteners. In addition, a sealing means such as a gasket 31 and the like may be included to effectively seal the outer housing 32 of the fluid reservoir 20 to the vehicle surface as desired.

Without limiting the system 10 to any particular materials of construction, the inlet member 12 and fluid reservoir 20 are suitably constructed from materials including, but not necessarily limited to those materials resistant to chipping, cracking, excessive bending and reshaping as a result of ozone, weathering, heat, moisture, other outside mechanical and chemical influences, physical impacts, and combinations thereof. In particular, the inlet member 12 and fluid reservoir 20 are suitably constructed from materials including but not necessarily limited to metals, polymeric materials, fiberglass, plexiglass, filled composite materials, and combinations thereof. Likewise, the inlet member 12 and fluid reservoir 20 may comprise any color or combination of colors. The inlet member 12 and fluid reservoir 20 may also be transparent and translucent as desired. In a particularly advantageous embodiment, the inlet member 12 and fluid reservoir 20 are each constructed of plastic.

Manufacture of the inlet member 12 and fluid reservoir 20 may be accomplished using known techniques including, but not necessarily limited to blow molding, injection molding, assembly of separate pre-formed individual components, and a combination thereof. The mode of manufacturing of the fluid reservoir 20 may be determined by one or more factors including, but not necessarily limited to (1) the type of vehicle, or in the case of an automobile the make and model thereof, (2) the intended use of the vehicle, (3) the anticipated retail cost of the system 10, (4) performance requirements of the system 10, and combinations thereof. The type of fluid reservoir 20 materials used may also depend on the type of fluid circulation means 14 employed, including the placement of the fluid circulation means 14 relative to the fluid reservoir 20.

Although not limited to a particular configuration, the fluid circulation means 14 may be (1) mounted adjacent the fluid reservoir 20, (2) releasably secured to the outside of the first fluid reservoir 20, or (3) housed within the fluid reservoir 20 as desired. Suitable fluid circulation means 14 include, but are not necessarily limited to pumps, siphoning devices or other pressure sources, blowers, propellers, push components to deliver captured fluid, and combinations thereof. For example, the fluid circulation means 14 may include an external or submersible pump. In one advantageous embodiment, the fluid circulation means 20 may include a positive displacement pump providing intermittent fluid flow from the fluid reservoir 20 to the outlet 18. In another particularly advantageous embodiment, the fluid circulation means 20 may include a centrifugal pump operationally configured to convey fluid from the fluid reservoir 20 to the outlet 18. Hereafter, the fluid circulation means 14 will be discussed in terms of a centrifugal pump ("pump 14").

As depicted in FIGS. 3, 4, 5A and 5B, the pump 14 is suitably located within the second compartment 34 in a manner effective to seal the pump 14 from the captured fluid located within the first compartment 33 of the fluid reservoir 20. The second compartment 34 is effectively sealed off from the first compartment 33 via a wall 36. Suitably, the wall 36 comprises at least one aperture providing a fluid outlet 21 from the first compartment 33 to the second compartment 34. As shown in FIGS. 3 and 4, a pump inlet 39A is suitably attached at the outlet 21 providing for fluid communication there between. As shown in FIG. 5A, the pump inlet 39A is suitably fluidly connected to the outlet 21 via a first conduit 41A, and the pump outlet 39B is suitably fluidly connected to the valve 30 via a second conduit 41B. In operation, captured fluid is transferred through the reservoir inlet 19 and stored in the first compartment 33. Upon pump 14 activation, fluid is conveyed from the first compartment 33 through the pump 14 and valve 30 to the conduit 22.

With reference to FIG. 3, the pump inlet 39A is suitably sealed or otherwise mated to the outlet 21 via a coupling 29 or other connection means. Suitable couplings include, but are not necessarily limited to rubber couplings and brass couplings. In the embodiment of FIG. 5A, a male type pump inlet 39A and outlet 39B suitably provide for mating to the conduits 41A, 41B as typically found with conduit/nipple type fittings.

Turning now to the overflow outlet 23 of the fluid reservoir 20, the overflow outlet 23 may be located at any point along the outer housing 32 as desired. In one embodiment, the overflow outlet 23 may be located along the outer housing 32 at a point corresponding to the maximum fluid volume of the system 10. In another embodiment, the overflow outlet 23 may be located along the outer housing 32 at a point to ensure the availability of a fluid volume necessary to fill a particular second fluid reservoir 24. In another embodiment, the fluid reservoir 20 may further include a bottom plug 80 for emptying fluid there from. In still another embodiment, the fluid reservoir 20 may include only a bottom plug 80 with no overflow outlet 23.

In one exemplary embodiment of a system 10 requiring a maximum fluid volume of about 0.15 liters (about 5.0 ounces) including a fluid reservoir 20 having a maximum capacity of about 0.3 liters (about 10.0 ounces), the overflow outlet 23 may be positioned at a point along the outer housing 32 effective for the fluid reservoir 20 to hold up to about 0.15 liters (about 5.0 ounces) of fluid wherein additional fluid dumps out from the fluid reservoir 20 through the overflow outlet 23. Although the fluid reservoir 20 may be built to scale, for automobile applications a maximum fluid volume of the fluid reservoir 20 is from about 0.06 liters to about 0.12 liters (from about 2.0 ounces to about 4.0 ounces).

Whereas the overflow outlet 23 determines the maximum amount of available fluid in the fluid reservoir 20, the fluid volume sensor system 15 is operationally configured to activate the pump 14 as determined by the fluid level in the fluid reservoir 20. Once the pump 14 is activated, a predetermined volume of fluid is transferred from the fluid reservoir 20 to the conduit 22.

Suitably, the fluid volume sensor system 15 is in electrical communication with pump 14 whereby the fluid volume sensor system 15 is operable to activate the pump 14 once the fluid volume within the fluid reservoir 20 rises to a predetermined level. Suitable fluid level sensors 40 include, but are not necessarily limited to float-type switches, hydroelectric switches, pressure sensors/probes, and fluid level sensors/probes. A suitable electrical connection means between the sensors of the system 10 and the pump 14 includes those means known to persons of ordinary skill in electrical wiring, such as but not necessarily limited to electrical plugs, quick connects, and hardwire techniques such as wire splices, soldered connections, and crimp splices. As shown in FIG. 5A, the fluid reservoir 20 suitably includes a wiring access port 65 for receiving the system's 10 electric connections therein.

With reference to FIG. 3, in an embodiment of the fluid reservoir 20 where the fluid level sensor 40 includes a "float switch" as understood by persons of ordinary skill in the art of fluid level sensors, the fluid reservoir 20 suitably includes a baffle array 42 that partially encases or otherwise surrounds the float switch 40 to dissipate the wave energy of fluid housed within the fluid reservoir 20. In particular, the baffle array 42 is operationally configured to form a barrier around the fluid volume sensor system 15 to prevent the fluid level sensor 40 from erroneously activating and/or disabling the pump 14 as otherwise caused by fluid sloshing within the fluid reservoir 20 during vehicle use, e.g., an automobile driving along a bumpy road. Although not limited to any particular configuration, a suitable baffle array 42 is disposed along a vertical plane, whereby fluid may contact the fluid volume sensor system 15 by flowing underneath the baffle array 42. As shown in FIG. 3, the baffle array 42 may include a solid structure extending from the inner surface of the outer housing 32 to the solid barrier 36 effectively sealing off the float switch 40 along a substantially vertical plane. The baffle array 42 may also comprise one or more apertures there through as desired.

The float switch 40 suitably operates in a manner effective to provide an enabling electrical connection to the pump 14 as the float switch 40 rises to a predetermined height within the fluid reservoir 20 (see line A-A in FIG. 4). As shown, the maximum rise level of the float switch 40 (also referred to herein as the "activation level") may be limited by either (1) the maximum fluid level of the fluid reservoir 20, or (2) the location of the overflow outlet 23. In a particularly advantageous embodiment, the activation level of the pump 14 may be set within a range from about level with the overflow outlet 23 to a predetermined minimum level below the overflow outlet 23, e.g., line A-A. As the float switch 40 drops below line A-A or to a predetermined level (see line B-B in FIG. 4), the electrical connection between the float switch 40 and the pump 14 is suitably broken, thus disabling the pump 14.

Figure 9:
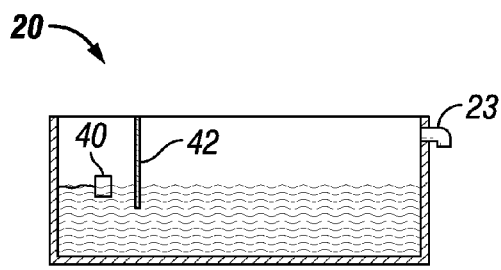
FIG. 9 is an illustration of a fluid reservoir employing a float switch and a baffle array forming a barrier around the float switch, wherein the fluid housed within the fluid reservoir has a substantially level surface.
Figure 10:
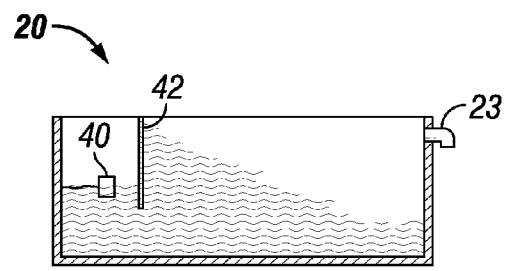
FIG. 10 illustrates the fluid reservoir of FIG. 9 depicting the baffle array operating to form a barrier against sloshing fluid within the fluid reservoir.

With reference now to FIGS. 7-10, simplified illustrations depicting how the baffle array 42 operationally prevents erroneous or non-requested pump 14 activity are shown. With particular attention to FIGS. 7 and 8, during vehicle use as fluid sloshes within the fluid reservoir 20 the float switch 40 rises to possibly erroneously activate the pump 14. However, when a baffle array 42 is employed as depicted in FIGS. 9 and 10, the baffle array 42 suitably forms a barrier against sloshing fluid allowing the pump 14 to receive accurate signals from the float switch 40 regarding the real time fluid volume within the fluid reservoir 20 to accurately activate and deactivate the pump 14. Suitable float type switches are commercially available from the following sources via the internet: www.suntekstore.com; www.gemssensors.com, www.aquahub.com, and www.meder.com.

Figure 11:
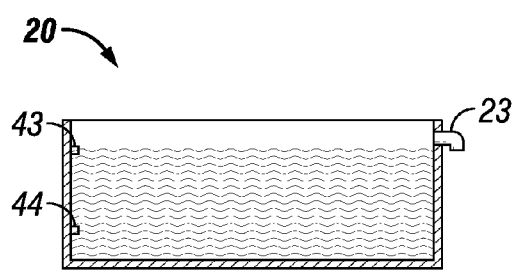
FIG. 11 illustrates an embodiment of a fluid reservoir including fluid level sensors in the form of probes spaced apart within the fluid reservoir, wherein the fluid level surface is in contact with the uppermost probe.
Figure 12:
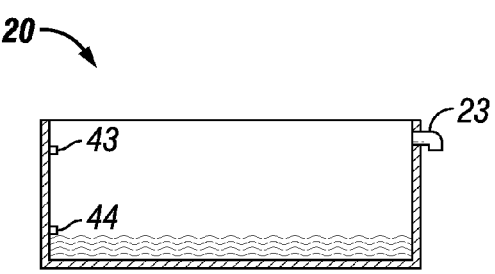
FIG. 12 illustrates the fluid reservoir of FIG. 11 wherein the fluid level surface is in contact with the bottommost probe.

Turning to FIGS. 11 and 12, the fluid volume sensor system 15 may include fluid level sensors in the form of probes spaced apart within the fluid reservoir 20, the probes being operationally configured to signal the pump 14 to activate/deactivate as the captured fluid reaches a predetermined level within the fluid reservoir 20. In this embodiment, a first sensor 43 is positioned along the inner surface of the fluid reservoir 20 establishing a pump 14 activation level including a maximum operational fluid volume within the fluid reservoir 20. A second sensor 44 is positioned along the inner surface of the fluid reservoir 20 establishing a minimum operational fluid volume within the fluid reservoir 20. As the fluid volume rises to contact the first sensor 43 (see FIG. 11) the first sensor 43 is operationally configured to activate the pump 14 to pump fluid out from the fluid reservoir 20 into conduit 22. As the fluid level drops below the second sensor 44 (see FIG. 12) the second sensor 44 is operationally configured to deactivate the pump 14. Once the pump 14 is deactivated, the fluid reservoir 20 can begin the refill process for future pump 14 activation.

In the embodiment of FIGS. 11 and 12, the first and second sensors 43, 44 are suitably sealed to the outer housing 32 in a manner effective to prevent fluid loss through the outer housing 32. In one non-limiting embodiment, the sensors 43, 44 are molded to the outer housing 32 using epoxy or silicone. Although not limited to any particular sensor configuration, suitable sensors 43, 44 include fluid level switches operationally configured to provide a signal output with regard to the presence or absence of a fluid. In terms of automobile usage, the sensors 43, 44 may include pressure sensors or switches, or in the alternative, liquid level sensors or switches commercially available from the following sources via the internet: www.suntekstore.com; www.gemssensors.com, www.aquahub.com, and www.meder.com.

In a particularly advantageous embodiment, a fluid level sensor 40 in the form of an optical liquid level sensor with an infra-red emitter and phototransistor may be employed (see FIG. 5B). As understood by persons of ordinary skill in the art of optical liquid level sensors, the fluid activation level of the pump 14 is suitably set at a level within the fluid reservoir 20 wherein the tip of the sensor 40 is immersed in fluid. Deactivation or inactivity of the pump 14 is suitably set when the tip of the sensor 40 is exposed to air. Suitable optical liquid level sensors may be acquired from SST Sensing, Ltd, United Kingdom; and Honeywell International Inc. With attention to FIGS. 5A and 5B, the pump 14 draws fluid from the first compartment 33 conveying the fluid through the valve 30 out from the fluid reservoir 20 to the conduit 22 where the fluid is directed toward the treatment member 16 and the outlet 18.

As illustrated in FIGS. 1 and 2, the conduit 22 fluidly connects the pump 14 to the outlet 18. In another embodiment, a separate second conduit may be implemented as a downstream conduit for fluidly connecting the treatment member 16 to the outlet 18. As known to persons of ordinary skill, the conduit 22 is suitably connected to fluid reservoir 20 and treatment member 16 via couplings or other fittings allowing for the release and/or replacement of the conduit 22, couplings, and other system 10 parts connected thereto.

Apposite conduit materials will become readily apparent to those skilled in the art, given the benefit of this disclosure. For instance, the conduit 22 may comprise any tubing effective for the transfer of fluid through the system 10. In addition, the conduit 22 may have any shape that is capable of transferring fluid through out the system 10. In one embodiment, the conduit 22 may be preformed for a particular application. In another embodiment, the conduit 22 may comprise flexible tubing. Non-limiting examples of suitable conduit materials include, but are not necessarily limited to metal alloys, glass, plastic, polymers, and combinations thereof. In a particularly advantageous embodiment, the conduit 22 is a flexible plastic hose or a silicone hose. Suitable fittings for securing the conduit 22 include but are not necessarily limited to zip ties and barbed fittings.

Concerning the treatment of captured fluid, the present system 10 is advantageous because it may be operationally configured to act upon captured fluid to provide one or more desired fluid end product(s). Although captured fluid may be treated through out the system 10, suitable treatment locations include, but are not necessarily limited to (1) the fluid reservoir 20, (2) the conduit 22, (3) one or more treatment members 16, (4) other additional reservoirs incorporated into the system 10, and (5) combinations thereof.

The captured fluid may be treated to provide one or more specific fluid products as desired. Thus, the type of treatment member(s) 16 employed may vary depending on the nature of the fluid initially captured and/or the desired fluid end product(s). Suitable treatment of the captured fluid may be accomplished according to one or more of the following techniques: (1) filtering the captured fluid to remove undesired fluid(s), undesired impurities, particulates, and/or undesired organic matter; (2) altering the temperature of the captured fluid; (3) altering the chemical constituency of the captured fluid; (4) altering the pH of the captured fluid; (5) separating fluid constituents into a plurality of post-treatment fluid streams, e.g., fluids having different viscosities; (6) altering the color of the fluid; and combinations thereof.

Figure 13:
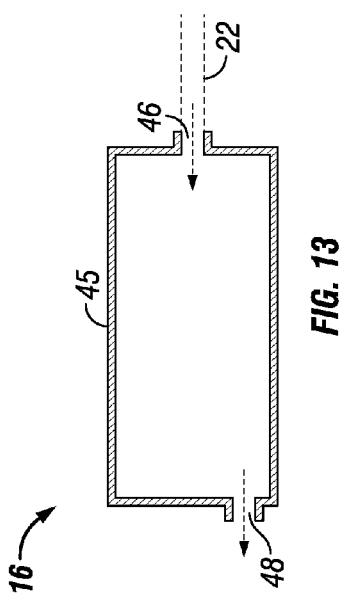
FIG. 13 is a side view of an exemplary treatment member of the system wherein the arrows show the directional flow of fluid through the treatment member.
Figure 14:
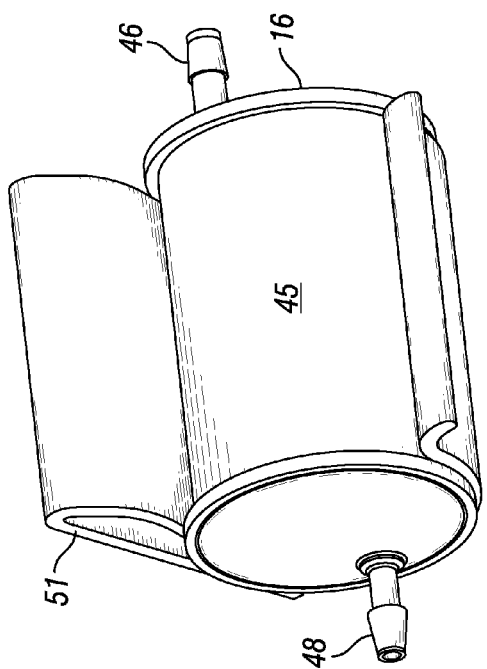
FIG. 14 is a perspective view of an embodiment of the treatment member snap fit within a corresponding mounting means.

The type of treatment members 16 employed may vary depending on the desired fluid product. Suitably treatment members 16 may include, but are not necessarily limited to filter media, ionization systems, ultraviolet light emitting systems, heating elements, separators, fluid material additive containers, and combinations thereof. One exemplary filter or fluid material additive container is shown in FIGS. 13 and 14. In this embodiment as illustrated by arrows in FIG. 13, the filter is operationally configured to receive fluid from the conduit 22 and treat the fluid therein (or otherwise act upon the fluid as desired). Once treated, the fluid may be directed to (1) a second fluid reservoir 24, (2) outlet 18, or (3) another filter depending on the system 10 configuration.

Figure 15:
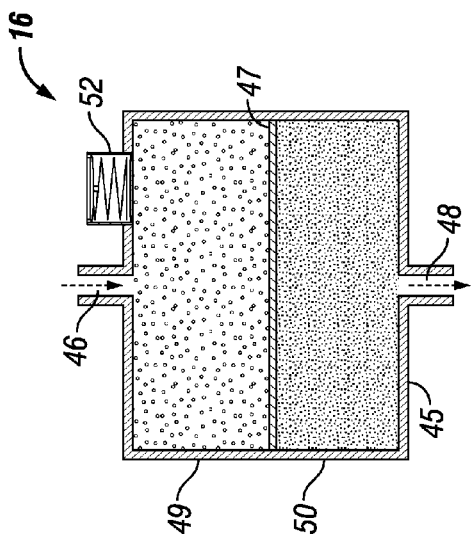
FIG. 15 is a side cross-sectional view of an embodiment of a treatment member including a fluid material additive and a filter housed therein.

With reference to FIG. 14, a suitable treatment member 16 comprises an outer housing 45 having an inlet 46 in fluid communication with the conduit 22 and an outlet 48 for treated fluid. In one embodiment, the outlet 48 may serve as the system 10 outlet 18. In another embodiment, the outlet 48 may lie in fluid communication with a conduit 22 configured to deliver treated fluid from the treatment member 16 to (1) a second fluid reservoir 24, (2) outlet 18, or (3) another filter as desired. Although the inner configuration of the treatment member 16 may vary, the treatment member 16 suitably includes one or more compartments operationally configured to treat fluid therein. As shown in FIGS. 13-15, the treatment member 16 is suitably oriented in a manner whereby the inlet 46 is set at a higher elevation than the outlet 48 to take advantage of gravity in addition to the conveyance forces generated by the pump 14 for dictating the fluid flow rate through the treatment member 16.

Depending on the intended use of the system 10, one suitable treatment member 16 intended to be mounted to a vehicle surface may be fitted with a corresponding mounting means 51 wherein the treatment member 16 suitably snap fits within the mounting means 51 as shown in FIG. 14. In automobile applications, the mounting means 51 is suitably releasably attached near the NC drip pan. For example, the mounting means 51 may be releasably attached to the fire wall or other substantially flat surface within the engine compartment of the automobile. The mounting means 51 may be attached to the automobile using one or more fasteners, adhesive tape, tie-wraps, or other tie type fasteners.

Referring to FIG. 15, the treatment member 16 may be operationally configured as a [fluid material additive+filter] combination for treating fluid passing there through. In this embodiment, the treatment member 16 suitably comprises at least two compartments 49, 50 separated by a partition 47. In this embodiment, the first compartment 49 is operationally configured to house one or more solid and/or gel like chemical components, the chemical component effectively acting on the fluid as the fluid enters the first compartment 49 wherein at least a portion of the chemical component is dissolved in the fluid. The second compartment 50 suitably comprises a one or more filters or membranes operationally configured to remove various substances from the captured fluid. Apposite filters or membranes are operationally configured to act on the captured fluid to remove various chemical constituents, undesired impurities, particulates, organic matter, and combinations thereof. In addition, the filters or membranes may be operationally configured to remove target fluids of particular densities.

As shown in FIG. 15, the partition 47 is operationally configured to separate two adjacent compartments. In a particularly advantageous embodiment, the partition 47 has an aperture means for the passage of fluid from the first compartment 49 to the second compartment 50. Suitably, the aperture means includes holes or slits effective to deny the passage of unwanted chemical additives and other particles that may otherwise clog the filter of the second compartment 50. The number of holes or slits in a particular partition 47 may vary depending on the intended use of the treatment member 16. For ease of manufacture, the partition 47 is suitably constructed from like materials as the housing 45, although this is not a requirement. In addition, the partition 47 may be releasably attached to the housing 45. In another embodiment, the partition 47 may include a mesh type material.

In the embodiment of FIG. 14, the treatment member 16 may be operationally configured to house one or more solid materials having particular chemical constituents as desired. While not limited to a particular configuration, solid chemical components are suitably provided in tablet form, pellet form, powder or granule form, block form, and combinations thereof, the number of solid chemical components housed within the treatment member 16 to vary as desired. Although the system 10 may be built to scale, a suitable treatment member 16 includes an inner housing of up to about a few inches in width and height depending on the chemical makeup of the tablet(s) and the intended use of the system 10. For example, where the tablets are intended to treat the captured fluid to produce windshield washer fluid to be directed to the windshield washer fluid reservoir, the tablets suitably have a width of up to about 3.81 cm (about 1.5 inches) and height of up to about 1.5 cm (about 0.59 inches). Suitable windshield washer fluid tablet products are commercially available from 303 Products, Inc., Palo Cedro, Calif.; and Chemplex Automotive Group, Inc, Fullerton, Calif.

The chemical components used may vary in chemical constituency depending on the intended use of the treated fluid of the system 10. For example, where the treated fluid is intended to be used as a windshield washing fluid for an automobile, the solid and gel like chemical components, e.g., tablets, suitably include (1) anti-freezing agents, (2) one or more components effective to dissolve and/or remove hydrocarbon residues such as petroleum derivatives, oils, fats, greases, sugars, and proteins, and combinations thereof from a vehicle windshield. In addition, where the treatment member 16 is operationally configured to provide an effective windshield washing fluid, the chemical components housed within the treatment member 16 may include, for example, detergents, pigments/dyes, solvents, anti-freeze, methylated spirits, and combinations thereof. Suitable solvents include methanol, ethanol, and combinations thereof. A suitable anti-freeze includes ethylene glycol and other commercially available anti-freeze chemicals. Each of the above listed components may be added to the captured fluid to provide a fluid end product effective for one or more of the following windshield washing applications: de-bugging, glass cleaning, as a rain repellant, and de-icing.

In another embodiment where the treated fluid is intended to be used as a radiator additive for an automobile, the solid and gel like chemical components within the treatment member 16 suitably include anti-freeze, rust inhibitors, rust removers, and combinations thereof. A suitable rust inhibitor or rust remover includes, but is not necessarily limited to phosphoric acid. In an embodiment where the captured fluid is $H_2O$ intended as potable $H_2O$, the first compartment 49 may house activated carbon or activated charcoal as the terms are known in the art. The treatment member 16 may also include a filter for removing impurities from the $H_2O$ prior to the $H_2O$ being directed through outlet 18. In another embodiment where the captured $H_2O$ is intended as potable $H_2O$, the treatment member 16 may include a reverse osmosis filter system.

With further reference to FIG. 15, filter media housed within the second compartment 50 suitably comprises a lattice structure operationally configured to prevent unwanted materials from exiting through the outlet 18. Without limiting the invention, suitable filter media include, but are not necessarily limited to filter paper, non-woven fabric, felt, and other materials having porous or semi-permeable membranes. In an embodiment of a filter constructed for automobile use, a suitable filter may remove unwanted particles while allowing added chemicals to pass there through. Suitable filter materials include those commercially available filters known to persons of ordinary skill in the art including, but not necessarily limited to filters constructed from woven fibrous material, non-woven fibrous material, fine mesh material, plastics, ceramics, charcoal cloth, polymeric fibrous pulp, foamed material, and combinations thereof. For commercial purposes, it is contemplated that the housing 45 may be replaced once the chemical components of the first compartment 49 and/or the filter media of the second compartment 50 have reached their usable life. It is also contemplated that the first compartment 49 may be refilled with chemical components as necessary, and that the filter media of the second compartment 50 may be replaced as necessary.

Figure 16:
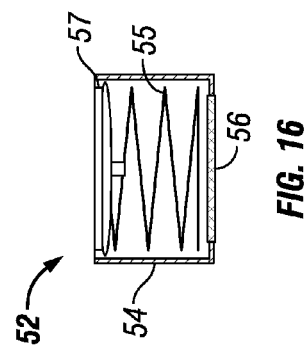
FIG. 16 is a cross-sectional view of an embodiment of an air vent of the treatment member of FIG. 15.

As shown in FIG. 15, the treatment member 16 may also comprise an air vent 52 for pressure equalization within the housing 45 to aid the flow of fluid from inlet 46 to outlet 48. One suitable embodiment of an air vent 52 is depicted in FIG. 16. In this embodiment, the air vent 52 includes a continuous wall member 54 operationally configured to house a biased member 55, a screen 56, and a diaphragm valve 57 therein. In a particularly advantageous embodiment, the wall member 54 includes a tubular configuration, the biased member 55 includes a compression spring, wherein the screen 56 has at least one aperture permitting at least some air flow there through. Although not limited to certain materials of construction, the wall member 54 and screen 56 are suitably constructed from similar materials such as plastics, metals, and combinations thereof. In operation, the air vent 52 is activated by a suction created as fluid travels toward and/or through outlet 48 allowing air to enter the housing 45.

The housing 45 may be manufactured using known techniques similar to those described above with reference to the fluid reservoir 20. Similarly, the housing 45 is suitably constructed from materials including, but not necessarily limited to those materials resistant to chipping, cracking, excessive bending and reshaping as a result of ozone, weathering, heat, moisture, other outside mechanical and chemical influences, as well as impacts. In particular, a suitable housing 45 may be constructed from materials including, but not necessarily limited to metals, plastics, fiberglass, plexiglass, filled composite materials, and combinations thereof. In a particularly advantageous embodiment, the housing 45 is constructed from plastic.

As previously stated, fluid may flow out of the system 10 once processed, or the fluid may be conveyed to one or more post-treatment fluid reservoirs for future use. With regard to automobiles, suitable post-treatment fluid reservoirs include, but are not necessarily limited to windshield washer fluid reservoirs, radiator overflow fluid reservoirs, potable water reservoirs, and water reservoirs for hydrogen generation.

With reference to FIG. 2, a system 10 operationally configured to convey processed fluid to a windshield washer fluid reservoir 24 suitably includes (a) a pump 14, (b) a fluid volume sensor system 15 within the fluid reservoir 20, (c) a fluid volume sensor system 70 within the windshield washer reservoir 24, and (d) a power source 58 having a positive terminal and a ground, all of which is connected to control circuitry 200. As shown, reservoirs 20, 24 are in electrical communication with the pump 14 via control circuitry 200 in a manner effective to promote optimal system 10 operation while safeguarding against non-requested operation of the pump 14 during vehicle use.

FIG. 17 shows a schematic of representative control circuitry 200 as provided via a circuit board. Control circuitry 200 may include the above mentioned components, as well as one or more fuses, an optional power switch, an optional temperature switch, an optional timer relay to delay pump 14 activation and/or determine the time for pump 14 operation once activated, a flow switch, and an optional operator signaling means, which in a particular embodiment may all lie in communication with a relay terminal. The fuses and switches include those known to persons skilled in electronic circuitry.

Where the present system 10 is designed for automobile use, the automobile may be fitted with an operator signaling means in the form of one or more light sources and audible signals suitably installed in the automobile dashboard, driver side door panel, or middle seat console. A suitable light source includes light emitting diodes ("LED"). In an embodiment of the system 10 operationally configured for the manual capture and processing of fluid for refilling a windshield washer fluid reservoir 24, an automobile may be manufactured to include some form of warning signal such as a light source and/or audible signal to indicate when the fluid level of the washer fluid reservoir 24 is sufficiently low or drops to a predetermined level. In addition, an automobile may be fitted with a first signaling means to indicate when the system 10 is powered on/off, and a second signaling means to indicate when the pump 14 is actually pumping fluid—both of which compliment the preexisting fluid level indicator provided by the automobile manufacturer.

With further reference to FIG. 17, persons of ordinary skill in the art can appreciate the various relays of the control circuitry to open and close in a manner effective to accomplish one or more of the following functions: (1) setting the pump 14 to an OFF position when both the fluid reservoir 20 and second fluid reservoir 24 have sufficient fluid levels, (2) setting the pump 14 to an ON position when both the fluid reservoir 20 and second fluid reservoir 24 have insufficient fluid levels thereby activating the pump 14, (3) setting the pump 14 to an OFF position when both the fluid reservoir 20 and second fluid reservoir 24 are empty or have low fluid levels, (4) setting the pump 14 to an OFF position when the fluid reservoir 20 has a low fluid level (or empty) and the second fluid reservoir 24 has a sufficient fluid level, (5) setting the pump 14 to an OFF position when the ambient temperature of the system drops to about freezing, and (6) setting the main switch of the system 10 in an OFF position. Table 1 below provides a parts list for a representative circuitry printed circuit board of FIG. 17.

TABLE 1

| Manufacturer and Part Number | Description | Designator | Value | Quantity |
|---|---|---|---|---|
| Kemet B45196H7224M209 | CAP TANT .22 UF 50 V 1206 (3528-21) | C1 | .22 uF | 1 |
| Kemet B45196H3107M409 | CAP TANT 100 UF 16 V 1206 (7343-31) | C2, C4, C8 | 100 uF | 3 |
| Kemet B45196H2105M109 | CAP TANT 1 uF 10 V 1206 (3216-18) | C3, C6 | 1 uF | 2 |
| TDK Corporation C1005X8R1E103K | CAP TANT 0.01 UF 6.3 V 0402 | C5 | 0.01 uF | 1 |
| Kemet B45196H3107M409 | CAP TANT 100 UF 16 V 1206 (7343-31) | C7 | 0.22 uF | 1 |
| Little fuse 1N4148W-TP | Diodes 1N4148 SOD-123 | D1 | | 1 |
| Panasonic JSM1-12V-4 | SPDT Relay 12 V, 640 mW | K1 | | 1 |
| Molex 43650-0315 | CONN HEADER 3 POS 3 MM VERT TIN | P1, P2, P3, P4 | | 4 |
| Fairchild Semiconductor MMBT3904 | TRANSISTOR GP NPN AMP SOT-23B | Q1 | | 1 |
| Susumu Co Ltd RG2012P-102-B-T5 | RES 1.0K OHM ⅛ W .1% 0805 SMD | R1, R2, R4, R7 | 1K | 4 |
| Susumu Co Ltd RGH2012-2E-P-103-B | Resistor 10K OHM ¼ W 0805 | R3 | 10K | 1 |
| Susumu Co Ltd RGH2012-2E-P-3753-B | Resistor 375K Ohms ¼ W 0805 | R5 | 375K | 1 |
| Rohm ESR10EZPF2203 | RES 220 KOHM ¼ W 5% 0805 SMD | R8 | 220K | 1 |
| Fairchild Semiconductor 74AC04MTC | IC HEX INVERTER 14-TSOP | U1 | | 1 |
| Fairchild Semiconductor 74AC08MTC | IC HEX AND GATE 14-TSOP | U2 | | 1 |
| National Semiconductor LM26CIM5-HHD/NOPB | IC Thermostat preset SOT23-5 | U3 | | 1 |
| National Semiconductor LM555CMM | Timer 555 Package Number MUA08A | U4 | | 1 |
| National Semiconductor LM340T-5.0/NOPB | C REGULATOR POSITIVE 5 V TO-220 T0220 | VR1 | | 1 |
| Micrel MIC5209-3.0YS | 500 mA Low Noice LDO Voltage Regulator | VR2 | | 1 |

Although the output voltage may vary depending on the vehicle and/or the application of use, a suitable output voltage of an automobile type power source is about 12 volts D.C. A system 10 designed for automobiles may include a lead-acid battery as the power source.

A power switch may be incorporated into the system 10 as desired. Thus, in one aspect of operation the system 10 may be wholly automated, whereas incorporation of a power switch allows the system 10 to be controlled manually. The power switch may be selected from switches well known to those of ordinary skill in the art, including for example, bush-button switches, a toggle switches, rocker switches, and slide switches. Although the placement of the power switch may vary, the power switch is suitably located in convenient proximity to the vehicle operator in like manner as other control panel objects. In an automobile for example, the power switch may be located on the dashboard, driver side door panel, or middle seat console. In operation, the power switch allows the vehicle operator to selectively operate the system 10—deciding whether he/she wants the system 10 on or off.

Another advantage of the present system 10 includes the option of a temperature switch to control the system 10 usage during cold weather conditions, wherein once the ambient temperature of the system 10 has reached about 0° C. (about 32° F.), the temperature switch is operationally configured to deactivate the system.

It is also contemplated that in one embodiment of the invention, a pump 14 time delay means of the system 10 may be controlled by a time delay chip as known to persons of ordinary skill in electronics.

It is also contemplated that in one embodiment of the invention, a filter or similar item may be placed at a point between the fluid reservoir 20 and the pump 14 whereby the filter or similar item is in fluid communication with both the fluid reservoir 20 and the pump 14 as a further treatment means of the fluid.

It is also contemplated that in one embodiment of the invention, an in-line check valve may be incorporated in the conduit 22 at a point between the pump 14 and the treatment member 16.

The invention will be better understood with reference to the following non-limiting examples, which are illustrative only and not intended to limit the present invention to a particular embodiment.

Example 1

In a first non-limiting example of the system 10 operationally configured to capture water condensate from an automobile A/C, process the water, and convey the processed water to the automobile's windshield washer fluid reservoir 24, the system 10 comprises the features discussed below.

The pump 14 of the system 10 will run automatically once the captured water condensate within the fluid reservoir 20 rises to at least the level of the optical liquid level sensor 40. The pump 14 will continue to run for approximately twenty-five seconds until the water volume within the fluid reservoir 20 is substantially drained, or until the fluid level in the automobile's windshield washer fluid reservoir 24 has risen to at least the level of the fluid volume sensor system 70 within the windshield washer reservoir 24.

A/C—System Interface

Fluid communication between the automobile A/C and the system 10 is achieved via an inlet member 12 comprised of a rubber nipple at a first end operationally configured to fit any condensate pan drip hole transfer tubing having a diameter from about 0.95 cm to about 1.9 cm (about 0.375 inch to about 0.75 inch). Sealable passage of condensed water from the A/C to the fluid reservoir 20 is accomplished by orienting the through hole at the bottom center of the nipple. The opposing side of the inlet member 12 operationally configured to mate with the fluid reservoir 20 is provided with a second nipple suitably manufactured from a resilient yet durable rubber or plastic effective to withstand normal engine compartment and outdoor operating temperatures. Suitably the second nipple is a tubular type nipple having an outer diameter of about 0.95 cm (about 0.375 inch). Water will be delivered to the fluid reservoir 20 through this connection. Once the volume of water in the fluid reservoir 20 rises to at least the level of the optical liquid level sensor 40, the pump 14 is operable to run for approximately twenty-five seconds, draining the fluid reservoir 20 conveying the water to the conduit 22.

Fluid Reservoir Components
Pump 14: —3 vdc×3/10 amps
Pump tubing connections: —Clear PVC tubing
 —inner diameter of about 0.33 cm (0.125 inch)
 —outer diameter of about 0.64 cm (0.25 inch)
Check Valve 30: —first nipple for connecting to pump discharge tubing, second nipple for connecting to discharge tubing extending beyond the outer housing 32 of the fluid reservoir 20 about 5.1 cm (2.0 inches)
Wiring Access Port 65: —Wiring harness with strain relief operationally configured to (1) allow for the passage of all necessary electrical wiring, and (2) seal out moisture.
Outer Housing 32: —Sealed at all mechanical interfaces using an amount of adhesive operationally configured to form a moisture barrier and complete seal at the interfaces.
Mounting Means: —The fluid reservoir 20 is mounted to a mounting bracket having snap features located on either side of the bracket. The bracket itself has a series of holes on its rear side which are intended to allow for the securing of the fluid reservoir 20 to the automobile using one or more tie wraps, which may be passed through the holes and through crumple zone holes or other features commonly found on automobiles.

The fluid reservoir 20 is constructed from Acrylonitrile-Butadiene-Styrene ("ABS") thermoplastic.

Treatment Member

The treatment member is provided as a filter 16 operationally configured to receive water from the fluid reservoir 20 via conduit 22. The filter 16 has an inlet 46 and an outlet 48 operationally configured to sealably mate with conduit 22 of the system 10. The conduit 22 of the system 10 has an inner diameter of about 0.33 cm (0.125 inch) and an outer diameter of about 0.64 cm (0.25 inch). The filter 16 has an inner diameter of about 2.3 cm (about 0.9 inches). The filter 16 is constructed from ABS thermoplastic with a wall thickness of about 0.16 cm (about 0.063 inches).

The filter 16 houses the following components:
(1) Sponge Dam: a first and second sponge each having the following dimensions:
 about 1.6 cm (0.625 inch) in thickness
 about 2.3 cm (0.90 inch) in diameter
(2) Detergent Chemical: two 303 brand windshield washer fluid tablets oriented between the first and second sponges of the Sponge Dam
(3) Filter membrane: one nylon scouring pad having a thickness of about 0.32 cm (0.125 inch) is cut to about 2.54 cm (1.0 inch) in diameter and set inside the filter 16 near the outlet 48 adjacent the second sponge. A suitable scouring pad is available from 3M Corporation.

The filter 16 is releasably snap fit to a corresponding mounting bracket 51. The mounting bracket 51 is attached to the fire wall or other substantially smooth flat surface inside the engine compartment of the automobile using an adhesive tape.

The conduit 22 fluidly connecting the filter 16 to the windshield washer fluid reservoir 24 interfaces the fluid reservoir 24 with a barbed fitting of about 0.32 cm (0.125 inch) inner diameter that attaches to the fluid reservoir 24 inlet with a grommet seal.

Electronic Control Circuitry

The electronics are operationally configured to provide the following system 10 functionality:

(1) Pump 14 is turned to an ON position (A) once water in the fluid reservoir 20 has risen to at least the level of the optical liquid level sensor 40 wherein the optical liquid level sensor 40 indicates fluid reservoir 20 is sufficiently full of water, and (B) when the fluid level within the windshield washer fluid reservoir 24 is below the fluid volume sensor system 70 within the windshield washer reservoir 24.

(2) Once turned to an ON position, the pump 14 runs for approximately twenty-five seconds.

(3) The fluid reservoir 20 is provided with a temperature sensor operationally configured to disable the system 10 once the ambient temperature has reached about 0° C. (about 32° F.).

(4) The system 10 is powered by the automobile power supply (about 12V). Supply power to the system 10 is fused.

Example 2

Figure 17A:
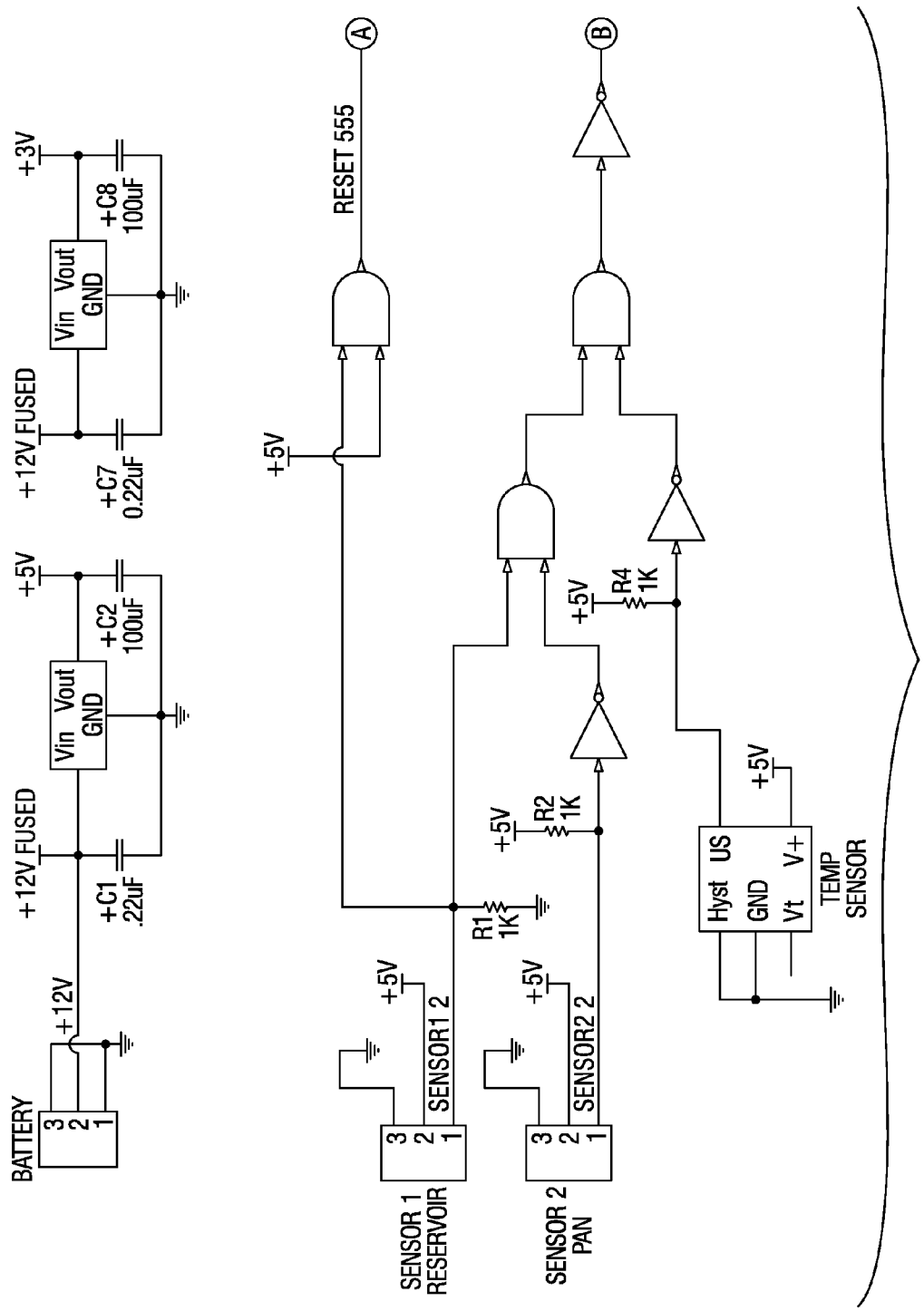
FIG. 17A is a first segment of an exemplary schematic of representative control circuitry of the present system.
Figure 17B:
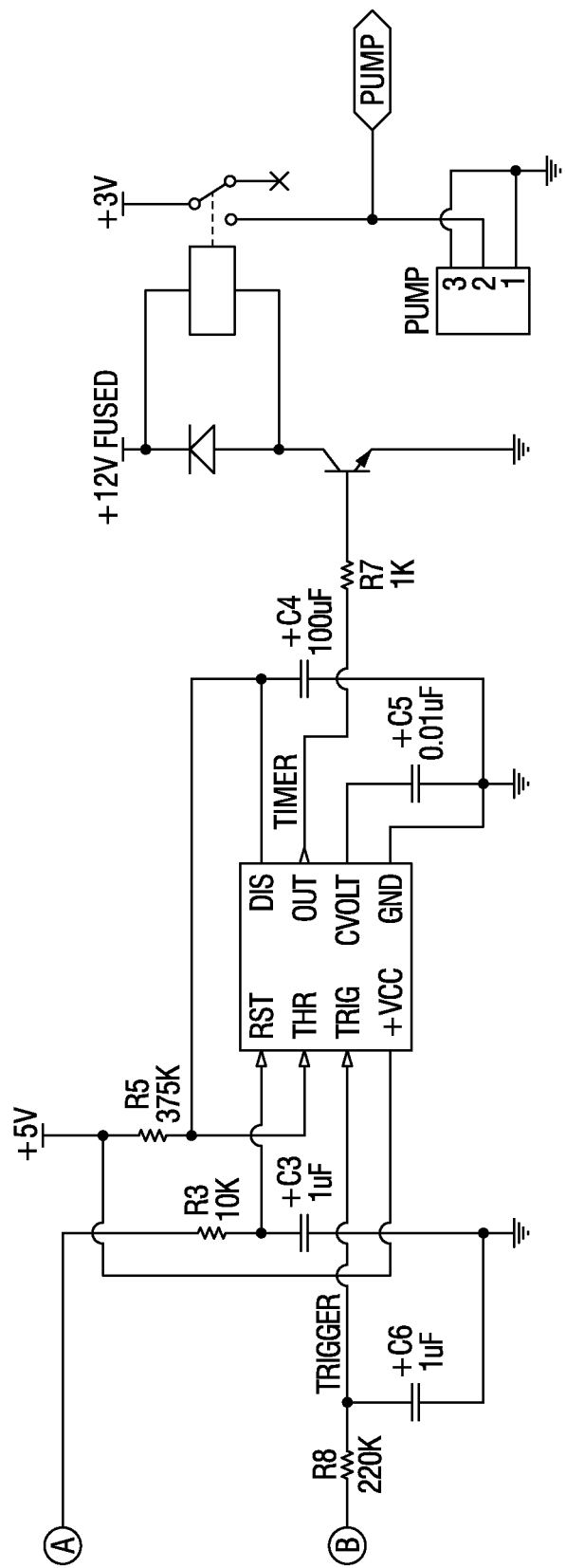
FIG. 17B is a second segment of the control circuitry of FIG. 17A.

In a second non-limiting example of the system 10 operationally configured to capture water condensate from an automobile A/C, process the water, and convey the processed water to the automobile's windshield washer fluid reservoir 24, the below described procedure is designed to test the electronics associated with the system 10. With reference to FIGS. 17A and 17B, this procedure is performed after the system 10 electronics have been assembled but prior to the electronics being assembled to the fluid reservoir 20.

Required Test Equipment
(1) One DC Power Supply capable of supplying 12-15V
(2) Digital voltmeter set to measure DC Voltage Test Procedure
(1) Power Conversion test:
  A. Connect 12V power supply positive output to connector P1-2 (+), and the negative to P1-1 (−),
  B. Turn on 12V power supply,
  C. Measure voltage between (P2) windshield washer fluid reservoir sensor leads P2-2 and P2-3. Voltage should read about +5V+/−0.2,
  D. Measure voltage across capacitor C8. Voltage should read about +3V+/−0.1,
  E. Measure voltage between P4-1 and P4-2 of pump. Voltage should read about 0V+/−0.2.
(2) Pump Test
  A. Measure voltage between P4-1 and P4-2. Voltage should read 0V+−0.2V,
  B. Connect a Jumper from P3-3 to P3-1 (pan sensor, i.e., fluid reservoir 20). This indicates that fluid reservoir 20 is full,
  C. Connect a Jumper from P2-2 to P3-1. This indicates that fluid reservoir 20 is not full,
  D. Measure voltage between P4-1 and P4-2. Voltage should read 3V for about twenty-five seconds+/−five seconds.

(3) Sensor Input Test
  A. Jumper P2 once installed indicates that the fluid level within the Fluid Reservoir 20 has not risen to at least the level of the optical liquid level sensor 40,
  B. Jumper P3 once installed indicates that the fluid level within the Fluid Reservoir 20 has risen to at least the level of the optical liquid level sensor 40,
  C. (Temperature Sensor) cold indicates that the temperature reading is below about 0° C. (about 32° F.).

TABLE 2

| P2-1 to P2-2 | P3-1 to P3-3 | U3 | Result |
|---|---|---|---|
| Removed | N/A | N/A | P4-1 to P4-2 should be 0 volts (Reservoir is full) |
| Installed | Installed | Not Cold | P4-1 to P4-2 should be 3 V for approximately twenty-five seconds +/− 5 seconds; (windshield washer fluid reservoir 24 is empty, fluid reservoir 20 is full, temperature above 0° C. (about 32° F.)) |
| Installed | Removed | Not Cold | P4-1 to P4-2 should be 0 volts (windshield washer fluid reservoir 24 is empty, fluid reservoir 20 is empty, temperature above 0° C. (about 32° F.)) |
| N/A | N/A | Cold | P4-1 to P4-2 should be 0 volts (Temperature indicates water could be frozen) |

When Jumper P2 is removed the voltage at P4 should remain at 0V under all other conditions. When the temperature sensor is sprayed with cold spray or some means of taking the device to below 0° C. (about 32° F.), the output should remain at 0V under all other conditions. When Jumper P2 is installed and the temperature is above 0° C. (about 32° F.)), installing the jumper at P3 (sensor) should cause the voltage at P4 to go to 3V for approximately twenty-five seconds then return to 0V. Removing P3 should have no effect on the P4 output voltage.

Example 3

In a third non-limiting example of the system 10 operationally configured to capture water condensate from an automobile A/C, process the water, and convey the processed water to the automobile's windshield washer fluid reservoir 24, the following system 10 installation procedure may be employed.

(1) Parts List
  A. One elbow shaped inlet member 12 with hose barb, inlet member 12 having an inner diameter of about 0.95 cm (0.375 inch);
  B. One conduit 22 having a length of about 1.8 m (about 6.0 feet) and having an inner diameter of about 0.95 cm (0.375 inch);
  C. One Fluid Reservoir 20 Mounting Bracket
  D. Fluid Reservoir 20 having an external check valve 30, optical liquid level sensor 40, and power wiring (Red (+) and Black (−) attached;
  E. About 2.44 m (about 8.0 feet) in length rubber hose having inner diameter of about 0.32 cm (about 0.125 inch);
  F. One Rubber Grommet ("fluid reservoir 24 grommet") having an inner diameter of about 0.32 cm (about 0.125 inch);
  G. One Rubber Grommet (fluid reservoir 24 sensor 70 grommet) having an inner diameter of about 1.27 cm (about 0.5 inches);

H. Two Cable Ties, each having a length of about 63.5 cm (about 25.0 inches);
I. Ten Cable Ties, each having a length of about 20.3 cm (about 8.0 inches);
J. One Reservoir Hose Connector of about 0.32 cm (about 0.125 inch) in length;
K. Filter 16 and corresponding Bracket 51.

(2) Tools and Materials for Installation Purposes
A. Wire Cutter (Side Cutter—Dykes);
B. Adjustable wrench, 15.24 cm (6.0 inch);
C. Clear RTV Silicone;
D. Drill and Bits
  0.5 cm (3/16 inch) drill bit, and
  1.9 cm (0.75 inch) drill bit or hole saw;
E. Clean Cloth Rag;
F. Brake cleaner;
G. Vinyl electrical tape (1 roll).

(3) Installation—With automobile engine in an OFF position and sufficiently cool for potential human contact therewith, installation comprises:
A. Locating and cleaning the air conditioner condensate drip hole with a cloth;
B. Push a 0.95 cm (0.38 inch) hose onto the hose barbed first end of the inlet member 12 spreading a thin film of Silicone RTV onto the first end of the inlet member 12;
C. Mate the first end of the inlet member 12 with the air conditioner drip hole with 0.95 cm (0.38 inch) hose hanging adjacent the first end of the inlet member 12;
D. Locate a mounting surface for the fluid reservoir 20 bracket 25 at a point lower in elevation than the air conditioner condensate drip hole and away from engine and wheels;
E. Clean mounting surface thoroughly with brake cleaner;
F. Ensure length of conduit 22 is appropriate for system 10 operation;
G. Install fluid reservoir 20 mounting bracket 25 in a manner effective for the fluid reservoir 20 to drop down into the bracket 25 from an elevated position. Prior to mounting the bracket 25, spread a thin layer of RTV Silicone onto the back side of the bracket 25. Once the RTV Silicone is applied, the bracket 25 is secured to the mounting surface of the automobile using two cable ties of about 63.5 cm (about 25.0 inch) in length. Suitably the cable ties are double wrapped around the frame beam of the automobile and the bracket 25;
H. A single fluid level sensor 70 hole of about 1.9 cm (about 0.75 inch) in diameter is drilled into the upper portion of the side wall of the windshield washer fluid reservoir 24. A second hole is drilled into the side wall of the windshield washer fluid reservoir 24 about 5.1 cm (about 2.0 inch) away from the first sensor 70 hole. The second hole has a diameter of about 0.5 cm (about 0.19 inch) operationally configured to receive the conduit 22;
I. RTV Silicone is spread around the two drill holes prior to installing rubber grommets onto each of the holes;
J. Install the fluid reservoir 20 onto the bracket 25;
K. Attach appropriate hose to the check valve 30;
L. Attach the free end of appropriate hose to the hose barb located on the top of the fluid reservoir 20;
M. Run the optical liquid level sensor 40 with wiring and appropriate hose to the fluid reservoir 24 using cable ties, securing the cable ties to items having substantially low temperatures during automobile operations—items not affected by heat emanating from the automobile engine.
N. Install Filter 16 and filter mounting bracket 51 at easily accessible location somewhere along the conduit 22. Prior to installing the mounting bracket 51, clean the mounting surface of the automobile. Secure the mounting bracket 51 to the mounting surface via adhesive tape or "sticky tape" is commonly known in commerce.
O. Cut the rubber hose at filter 16 and install onto filter inlet 46 and outlet 48 barbs.
P. Without letting RTV Silicone contact the eye of the fluid level sensor 70, spread thin film of RTV Silicone onto threads of the fluid level sensor 70 and install into the corresponding grommet coiling any extra wire neatly and tape together and secure.
Q. Cut the rubber hose to proper length at the fluid reservoir 24 and push the corresponding hose connector into the hose end. The opposing end of the hose connector is pushed into the grommet of the fluid reservoir 24.
R. Run the power wiring harness from the fluid reservoir 20 to the automobile battery securing the wiring to substantially low temperature items of the automobile. Install the BLACK (−) wire terminal connector to ground and the RED (+) wire terminal connector to the positive pole of the battery.

The system 10 is now installed and will start operating automatically once the fluid reservoir 20 receives condensate water from the A/C when the automobile is running. Suitably, the instant filter 16 produces about 18.9 liters (about 5.0 gallons) of windshield washing fluid and filters out particulates that may collect in the system. Once the detergent in the filter 16 is spent, the system 10 continues filtering particulates from the water. To avoid algae or other build up or clogging within the filter 16, the filter 16 should be cleaned or changed once the filter 16 is spent of chemicals or once every six months.

Persons of ordinary skill in the art will recognize that many modifications may be made to the present application without departing from the spirit and scope of the application. The embodiment(s) described herein are meant to be illustrative only and should not be taken as limiting the invention, which is defined in the claims.

We claim:

1. A system for processing fluid captured from a vehicle surface comprising:
    a first reservoir operationally configured to receive fluid from the vehicle surface and to discharge fluid received therein;
    a fluid circulation means in fluid communication with the first reservoir and operationally configured to convey fluid out from the first reservoir;
    one or more treatment members in fluid communication with the first reservoir, the one or more treatment members being operationally configured to treat the captured fluid to provide a fluid product, the one or more treatment members being in fluid communication with an outlet of the system;
    a fluid volume sensor system in the first reservoir, the fluid volume sensor system being in electrical communication with the fluid circulation means, the fluid volume sensor system being operationally configured to identify the fluid volume within the first reservoir;
    a second reservoir in fluid communication with the first reservoir and the outlet of the system, the second reservoir including a fluid volume sensor system in electrical communication with the fluid circulation means, the fluid volume sensor system being operationally configured to identify the fluid volume within the second reservoir; and control circuitry in electrical communication with the fluid volume sensor systems of the first and second reservoirs and with the fluid circulation means, the control circuitry including a timer relay operationally configured to determine the operation time of the fluid circulation means once the fluid circulation means is activated, and with respect to the second reservoir the timer relay being operationally configured to delay activation of the fluid circulation means to safeguard the system against non-requested operation of the fluid circulation means during vehicle use;

wherein operation of the fluid circulation means is determined according to the fluid volume within the first reservoir, the second reservoir and operation of the timer relay in relation to the second reservoir; and wherein the system is powered by a power source originating from the vehicle.

2. The system of claim 1 wherein the one or more treatment members include an inlet for receiving fluid from the first reservoir and an outlet for discharging treated fluid out from the treatment members, wherein the inlet is set at a higher elevation than the outlet.

3. The system of claim 1 wherein the one or more treatment members are operationally configured to treat the captured fluid to provide a fluid product having a chemical constituency different than the chemical constituency of the captured fluid.

4. The system of claim 2 wherein the one or more treatment members are operationally configured to treat the captured fluid to provide a fluid product having a chemical constituency different than the chemical constituency of the captured fluid.

5. The system of claim 1 wherein the one or more treatment members are selected from the group consisting of filter media, ionization systems, ultraviolet light emitting systems, heating elements, separators, fluid material additive containers, and combinations thereof.

6. The system of claim 1 wherein the one or more treatment members include at least one fluid material additive and at least one filter therein.

7. The system of claim 6 wherein the fluid material additive includes a solid chemical component in tablet form.

8. The system of claim 7 wherein the solid chemical component is selected from the group consisting of anti-freezing agents, one or more components effective to dissolve hydrocarbon residues, and combinations thereof.

9. The system of claim 8 wherein the one or more components is selected from the group consisting of detergents, solvents, anti-freeze, methylated spirits, and combinations thereof.

10. The system of claim 1 wherein the fluid volume sensor system of the second fluid reservoir is located near the top of the second fluid reservoir.

11. The system of claim 10 wherein the second fluid reservoir includes a windshield washer fluid reservoir.

12. The system of claim 1 further comprising a temperature sensor operationally configured to deactivate the system when the ambient temperature of the system is about 0° C.

13. The system of claim 1 further including a valve in fluid communication with the fluid circulation means, the valve being operationally configured to regulate back flow of fluid in the system.

14. The system of claim 1, wherein the fluid volume sensor system includes an optical liquid level sensor.

15. The system of claim 11, wherein the fluid volume sensor is an optical liquid level sensor.

16. A system for processing water captured from a vehicle air conditioner drip pan comprising:

a first reservoir defined by a housing having a first compartment and a second compartment therein, the second compartment being operationally configured to receive water from the drip pan, the first compartment being operationally configured to store water from the drip pan;

a pump located within the second compartment of the first reservoir, the pump being in fluid communication with the first compartment and operationally configured to convey water out from the first compartment through the second compartment of the reservoir;

one or more treatment members in fluid communication with the pump, the one or more treatment members being operationally configured to treat the captured water;

a second reservoir in fluid communication with the one or more treatment members, the second reservoir being operationally configured to receive treated water from the one or more treatment members; and a fluid volume sensor system including a fluid volume sensor in the first reservoir and a fluid volume sensor in the second reservoir, the fluid volume sensor system being in electrical communication with the pump via control circuitry and operationally configured to identify the water volume within the first and second reservoirs, the control circuitry including a timer relay operationally configured to delay activation of the pump with regard to the water volume identified in the second reservoir and to determine the duration of operation of the pump once the pump is activated;

wherein pump activation is determined by the water volume within the first and second reservoirs and according to operation of the timer relay with regard to the water volume identified in the second reservoir; and wherein the treated water has a chemical constituency different than the chemical constituency of the captured water.

17. The system of claim 16 further comprising a check valve in fluid communication with the pump and one or more treatment members.

18. A method for processing fluid captured from a vehicle surface to maintain a windshield wiper fluid reservoir, the method comprising:

providing a system comprising (1) a first reservoir operationally configured to receive fluid from the vehicle surface and to discharge fluid received therein; (2) a fluid circulation means in fluid communication with the first reservoir and operationally configured to convey fluid out from the first reservoir; (3) one or more treatment members in fluid communication with the first reservoir, the one or more treatment members being operationally configured to treat the captured fluid to provide a fluid product, the one or more treatment members being in fluid communication with an outlet of the system; (4) a first fluid volume sensor system in the first reservoir and a second fluid volume sensor system in the windshield wiper fluid reservoir, the first fluid volume sensor system being operationally configured to identify the fluid volume within the first reservoir and the second fluid volume sensor system being operationally configured to identify the fluid volume within the windshield wiper fluid reservoir; and (5) control circuitry in electrical communication with the first and second fluid volume sensor systems and with the fluid circulation means, the control circuitry including a timer relay operationally configured to (a) delay activation of the fluid circulation means with regard to the fluid volume identified in the windshield wiper fluid reservoir and (b) determine the operation time of the fluid circulation means once the fluid circulation means is activated; wherein operation of the fluid circulation means may be determined according to the fluid volume within the reservoirs and according to operation of the timer relay in relation to the windshield wiper fluid reservoir; and wherein the system is powered by a power source originating from the vehicle;

capturing fluid from a vehicle surface and storing the fluid within the first reservoir;

conveying the fluid from the first reservoir to one or more treatment members; treating the fluid within the one or more treatment members; and conveying the treated fluid to the windshield wiper fluid reservoir.

19. The method of claim 18 wherein the processing of fluid occurs during vehicle use.

20. The method of claim 18 wherein fluid treatment is selected from the group consisting of (1) filtering the captured fluid, (2) altering the temperature of the captured fluid, (3) altering the chemical constituency of the captured fluid, (4) altering the pH of the captured fluid, (5) separating fluid constituents into a plurality of post-treatment fluid streams, (6) altering the color of the fluid, and combinations thereof.

* * * * *